United States Patent Office 3,442,816
Patented May 6, 1969

3,442,816
GENERATION OF LIGHT BY THE REACTION OF TETRACYANOETHYLENE OR OTHER ELECTRONEGATIVELY SUBSTITUTED ETHYLENE, ETHYLENE OXIDE AND CARBONYL COMPOUND WITH HYDROGEN PEROXIDE IN THE PRESENCE OF A FLUORESCER
Laszlo Joseph Bollyky, Stamford, Conn., assignor to American Cyanamid Company, Stamford, Conn., a corporation of Maine
No Drawing. Filed Feb. 23, 1966, Ser. No. 529,226
Int. Cl. C09k 1/02; B01j 1/00
U.S. Cl. 252—188.3         10 Claims

ABSTRACT OF THE DISCLOSURE

A method for obtaining chemiluminescent light by the reaction of a cyanoethylene or perhalocarbonyl compound with a peroxide in the presence of a fluorescer and a suitable diluent, and the composition providing such light.

---

The present invention relates to novel compositions of matter, as defined below, and reactions and to the direct generation of light from chemical energy employing such compositions. By "light" as referred to herein is meant electromagnetic radiation at wavelengths falling between about 350mμ and 800mμ.

The art of generating light from chemical energy, i.e., chemiluminescence, is continually in search of compositions which when reacted substantially improve the intensity and lifetime of light emission as contrasted to known chemiluminescent compositions and reactions. Obviously, improved compositions are constantly in demand for use as signal devices, for area illumination, etc.

The art has known for some time that oxalyl chloride in combination with aqueous (30%) hydrogen peroxide and a fluorescent compound generates a light whose lifetime is very short (on the order of about 8 to 30 seconds) and whose intensity is of little practical utility.

The mechanisms by which chemiluminescent light may be generated are so poorly understood that it is not possible at present to predict those structures which convey the chemiluminescent property. This is amply illustrated by the phthalhydrazide series of compounds, some of which are chemiluminescent and some of which are not chemiluminescent (See A. Bernanose, Bull. Soc. Chim. France, 17,567 (1950).)

It is an object of this invention to obtain a chemiluminescent composition and a process employing the composition of this invention whereby a high efficiency may be obtained in the conversion of chemical energy into light.

Another object is to obtain a chemiluminescent compound which produces light over an extended period of time.

Another object of this invention is to obtain a chemiluminescent composition which attains light of substantially higher intensity than has been obtained with many former chemiluminescent compositions.

Another object of this invention is to obtain a chemiluminescent composition which may be employed to obtain light by a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

The term "chemiluminescent reactant," as used herein, means (1) a mixture which will result in a chemiluminescent reaction when reacted with other necessary reactants in the processes as disclosed herein, or (2) a chemiluminescent composition.

The term "fluorescent compound," as used herein, means a compound which fluoresces in a chemiluminescent reaction, or a compound which produces a fluorescent compound in a chemiluminescent reaction.

The term "chemiluminescent composition," as used herein, means a mixture which will result in chemiluminescence.

The term "admixing," as used herein, means "reacting" or sufficiently bringing together component reactants to obtain chemiluminescent reaction.

The term "hydroperoxide compound", as used herein is limited to peroxide compounds having at least one HOO— group, or a compound which upon reaction produces a compound with such a group.

The term "peroxidic groups" as used herein, represents

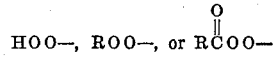

R' is defined in the esters below, while R is a substituent such as alkyl, cycloalkyl, α-hydroxyalkyl, substituted alkyl, for example.

The term "diluent," as used herein, means a solvent or a vehicle which when employed with a solvent does not cause insolubility.

The term "peroxide compound," as used herein, also includes compounds which upon reaction produce the peroxide group.

The term "hydrogen peroxide compound" includes (1) hydrogen peroxide and (2) hydrogen peroxide-producing compounds.

The term "solid," as used herein, refers to a state in which the materials are in the absence of a solvent such as dimethoxyethane and/or other diluent, and the material way be virtually in the form for a single solid state, or of lumps, or of ground or crushed particles, or of a powdery material.

Whe have unexpectedly discovered that the objects of this invention are obtained by admixing (1) a hydroperoxide, (2) a fluorescent compound, (3) a diluent, (4) preferably sufficient alkaline material to obtain a pH above about pH 7.0 and (5) a chemiluminescent composition of the formula:

where A represents any of the following groups:

(1)

i.e., a vinylidene group substituted by $X^2$ and $Y^2$;

(2)

i.e., an epoxyethylidene group substituted by $X^3$ and $Y^3$; (3) =C=O, i.e., oxomethylene group; (4) =C=S, i.e., thioxomethylene group.

The pairs of substituents, $X^1$, $Y^1$, $X^2$, $Y^2$, $X^3$, $Y^3$, are selected from the following group of substituents: —CN (cyano); —CCl$_3$ (trichloromethyl); —CBr$_3$ (tribromomethyl); —CF$_3$ (trifluoromethyl); —Cl (chloro); —Br (bromo); and —F (fluoro); provided at least one substituent of each X—Y pair above must be chosen from the following group: —CN (cyano); —CCl₃ (trichloromethyl); CBr₃ (tribromomethyl); —CF₃ (trifluoromethyl).

The compounds of the above general formula may be divided into two groups of generically related compounds as follows:

(I) (a) Tetracyanoethylene (NC)₂—C=C—(CN)₂ and (b) compounds obtainable from tetracyanoethylene at the conditions of the chemiluminescent reaction. These latter compounds are tetracyanoethyleneoxide

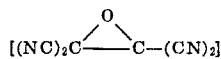

tetracyanoethylenediol

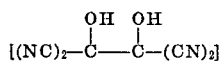

carbonylcyanide [(NC)₂C=O]. The relationship between these compounds is pointed out further in the mechanism discussion below. The term "tetracyanoethylene composition" as used herein includes both (1) tetracyanoethylene and (2) compounds obtainable from tetracyanoethylene at the conditions of the chemiluminescent reaction.

(II) Perhalocarbonyl composition group include perhaloacetylhalides as follows:

trichloroacetyl chloride

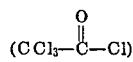

tribromoacetyl bromide

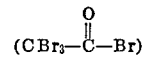

trifluoroacetylfluoride

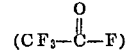

and perhaloacetones as hexachloroacetone

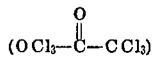

hexabromoacetone

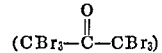

and hexafluoroacetone

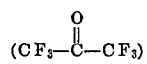

The peroxide employed in the compositions and process of this invention may be obtained from any suitable peroxide compound. For example, the peroxide may be employed as sodium peroxide. Alternatively, sodium perborate may be placed in aqueous solution whereby a solution of hydrogen peroxide is obtained. Obviously, hydrogen peroxide or its solution may be employed. Although the presence of base is critical in order to obtain the preferred optimum maximum-intensity chemiluminescence in certain embodiments of this invention, the peroxide employed may be obtained from anhydrous hydrogen peroxide compounds such as perhydrate of urea (urea peroxide), perhydrate of pyrophosphate (sodium pyrophosphate peroxide), pyrohydrate of histidine (histidine peroxide), sodium perborate, and the like. Still another form in which the anhydrous H₂O₂ may be provided in the composition is that of an anhydrous solution of H₂O₂ in a suitable solvent such as an ether, an ester, an aromatic hydrocarbon, etc. of the type which would provide a suitable diluent for the composition of this invention. Whenever hydrogen peroxide is contemplated to be employed, any suitable compound may be substituted which will produce hydrogen peroxide.

The peroxide concentration may range from about 15 molar down to about $10^{-5}$, preferably about 2 molar down to about $10^{-4}$ molar. The chemiluminescent composition of this invention may be added as a solid or in admixture with a suitable solid peroxide reactant or in a suitable diluent or alternatively dissolved directly in a solution containing the peroxide reactant.

Typical diluents within the purview of the instant discovery are those that do not readily react with a peroxide, such as hydrogen peroxide, and which do not readily react with the chemiluminescent composition of this invention.

Although the addition of water is not necessary for the production of chemiluminescent light in certain embodiments according to the present invention, water can be present in the diluent in small amounts, but less than about 5%. The term "water," as used herein, includes water-producing compounds such as hydrates. In addition, however, either one or more diluents may be included with or in the place of the water, as long as the peroxide employed is at least partially soluble in the diluent(s), such as, for example, at least one gram of H₂O₂ per liter of diluent. The following are illustrative of the additional diluents or solvents which may be employed: non-cyclic or cyclic ethers, such as diethyl ether, diamyl ether, diphenyl ether, anisole, tetrahydrofuran, dioxane, and the like; esters such as ethyl acetate, propyl formate, amyl acetate, dimethyl phthalate, diethyl phthalate, methyl benzoate, and the like; aromatic hydrocarbons, such as benzene, xylene, toluene, and the like; and polar organic solvents, such as dimethyl sulfoxide, dimethyl formamide, and the like.

The fluorescent compounds contemplated herein are numerous; and they may be defined broadly as those which do not readily react on contact with the peroxide employed in this invention, such as hydrogen peroxide; likewise, they do not readily react on contact with the ester of oxalic acid. Typical suitable fluorescent compounds for use in the present invention are those which have a spectral emission falling between 330 millimicrons and 800 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well known in the art. Many of these are fully described in Fluorescence and Phosphorescence, by Peter Pringsheim, Interscience Publishers, Inc., New York, N.Y., 1949. Other fluorescers are described in The Colour Index, second edition, vol. 2, The American Association of Textile Chemists and Colorists, 1956, pp. 2907–2923. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release.

It has been found that the molar (moles per liter of diluent) concentrations of the major components of the novel composition herein described may vary considerably. It is only necessary that components be in sufficient concentration to obtain chemiluminescence. The chemiluminescent composition of this invention must have a molar concentration normally in the range of at least about $10^{-7}$ to 5 molar, preferably in the range of at least about $10^{-4}$ to about 1 molar; the fluorescent compound is present in the range from about $10^{-5}$ to 5, preferably $10^{-4}$ to $10^{-1}$ molar; and the water or other diluent must be present in a sufficient amount to form at least a partial solution of the reactants involved in the chemiluminescent reaction. There is no known maximum limit on the concentration employed in the reaction. The chemiluminescent reactant of this invention may serve as either the sole diluent or a partial diluent.

The ingredients of the composition of this invention, may be admixed in a single stage of admixing or in a sequence of steps of admixing the separate ingredients. Accordingly, alternative compositions may be prepared which may be stored over a period of time and which may be admixed with the final ingredient at a time when the chemiluminescent lighting is desired. For example, one such composition would be a composition which includes a fluorescent compound but which does not include a peroxide compound. Another alternative composition would be a solid composition which includes a substantially solid tetracyanoethylene composition and a substantially solid hydroperoxide compound, and possibly additionally includes a solid fluorescent compound, but which does not include a diluent. Obviously the preferred compositions which would be less than all necessary components to produce a chemiluminescent light would be a composition which would be substantitly stable to a practical degree over an extended period of time; otherwise, there would be no real advantage in forming a chemiluminescent reactant to be employed in a subsequent chemiluminescent reaction.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

Although in the process of obtaining chemiluminescent light according to this invention, it is normally not necessary to employ a specific order of sequence of steps in the adding of the individual ingredients of the inventive chemiluminescent composition, it has been found that the fluorescent component preferably should be already in the reaction mixture at the time of addition of the last component necessary to bring about the chemical reaction and the concurrent release of chemical energy.

Additionally, it has been found that the superior intensity of chemiluminescence is obtained when the final mixture producing the luminescence is maintained at a temperature of between about $-40°$ C. and $75°$ C., preferably between about $20°$ C. and $50°$ C.; however, the luminescence of applicant's process is not limited to these ranges. However, temperature is not critical.

Additionally, the composition and the process which obtains preferred optimum chemiluminescent light intensity critically employs a base in an amount sufficient to produce a basic pH; for instance, see Examples 3 and 7. However, light can be obtained at lesser degrees at about neutral and acid conditions. Any suitable base which does not interfere with the chemiluminescent composition and process of this invention may be employed.

A wide variety of organic and inorganic bases is contemplated, typical bases being: sodium hydroxide, potassium hydroxide, potassium tertiary butoxide, sodium ethoxide, sodium methoxide, ammonium hydroxide, tetrabutyl ammonium hydroxide, triphenyl methide and the like.

The lifetime and the intensity of the chemiluminescent light can be regulated by the use of certain regulators such as:

(1) By the addition of base to the chemiluminescent composition. Both the strength and the concentration of the base are critical for purposes of regulation.

(2) By the variation of hydroperoxide. Both the type and the concentration of hydroperoxide are critical for the purposes of regulation.

In the practice of the above process to obtain chemiluminescent light, tetracyanoethylene (for example) is reacted with a hydroperoxide, such as hydrogen peroxide. The first product of the reaction is tetracyanoethylene oxide which can be isolated when the reaction is carried out in the absence of base catalysts. The preparation of ethylene oxide at similar conditions has been described by several authors.[1] Tetracyanoethylene oxide reacts with hydrogen peroxide in a subsequent reaction to afford carbonyl cyanide. The preparation of carbonyl cyanide at similar conditions has been described by others.[2]. A reaction of carbonyl cyanide with hydrogen peroxide produces a strong chemiluminescent light in the presence of a fluorescer. The same chemiluminescence is produced whether tetracyanoethylene, tetracyanoethylene oxide or carbonyl cyanide is used as starting material for the reaction. The mechanism of the applicant's invention, i.e., the reactions and the intermediate products, are represented by the following equations:

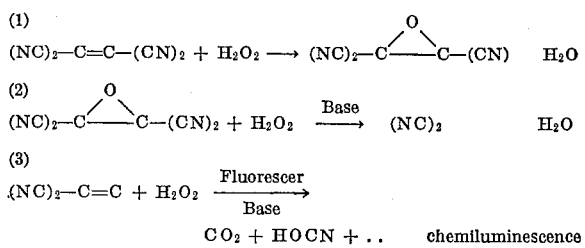

Although the above reactions are believed to be the mechanism by which applicant's invention produces chemiluminescent light, the invention disclosed herein is not to be restricted to this theory, except as limited in the appended claims.

Pursuant to the present invention disclosed herein, very intense light is generated and the light emissions last anywhere from an instantaneous and momentary emission to many times longer than that of many prior art compositions. The rate can be regulated as might be desired for any particular situation with the present invention.

The following examples are intended to illustrate the present invention and are in no way intended to limit the invention except as limited in the appended claims.

EXAMPLE 1

Approximately 3 mg. tetracyanoethylene is added to a 5 ml. solution of 1 mg. 9,10-diphenyl anthracene, 0.2 g. potassium hydroxide and 0.1 ml. anhydrous hydrogen peroxide in 1,2-dimethoxyethane (DME). A bright chemiluminescent light is observed on the addition of tetracyanoethylene.

The chemiluminescent light is also observed when the test is repeated but using 30% or 90% aqueous hydrogen peroxide in the place of anhydrous hydrogen peroxide. Thus both anhydrous and aqueous hydrogen peroxide may be employed to obtain chemiluminescence.

EXAMPLE 2

Aproximately 3 mg. tetracyanoethylene is added to a 5 ml. solution of 1 mg. 9,10-diphenylanthracene, 0.2 g. potassium hydroxide in 1,2-dimethoxyethane. A bright chemiluminescent light is also observed when the test ---
[1] W. T. Linn, O. W. Webster, R. E. Benson, J. Am. Chem. Soc. 87 3651 (1965), 85 2032 (1963).
A. Dieche, P. Dietrich, Chem. Ber. 96 3044 (1963).
[2] W. T. Linn, U.S. Patent No. 3,115,517 (1963).

is repeated but using rubrene in the place of 9,10-diphenyl-anthracene as fluorescer. Thus, either rubrene or 9,10-diphenylanthracene may be employed to obtain chemiluminescence.

EXAMPLE 3

The chemiluminescent light is also observed when Example 2 is repeated where potassium tertiary-butoxide is used in the place of potassium hydroxide. Thus, either potassium hydroxide or potassium tertiary-butoxide may be employed to obtain chemiluminescence.

EXAMPLE 4

The chemiluminescent light is also observed when Example 2 is repeated where dimethyl sulfoxide is used in the place of 1,2-dimethoxyethane solvent. Thus, either 1,2-dimethoxyethane or dimethylsulfoxide may be used to obtain chemiluminescence.

EXAMPLE 5

This experiment is designed to study the effect of the order of addition of the chemiluminescent reagents on the chemiluminescence.

Firstly, the approximately 3 mg. tetracyanoethylene is added to a 5 ml. solution of 1 mg. 9,10-diphenylanthracene and 0.2 ml. anhydrous hydrogen peroxide and 0.1 g. potassium-tert-butoxide in 1,2-dimethoxyethane.

Secondly, approximately 0.1 g. potassium-tert-butoxide is added to a 5 ml. solution of 1 mg. 9,10-diphenylanthracene, 3 mg. tetracyanoethylene and 0.2 ml. anhydrous hydrogen peroxide in 1,2-dimethoxyethane.

Thirdly, 0.2 ml. anhydrous hydrogen peroxide is added to a 5 ml. solution of 1 mg. 9,10-diphenylanthracene, 3 mg. tetracyanoethylene and 0.1 g. potassium-tert-butoxide in 1,2-dimethoxyethane.

All three experiments produce a bright chemiluminescent light. Thus, chemiluminescence may be obtained by the admixing of reagents in any order.

EXAMPLE 6

Approximately 3 mg. tetracyanoethylene is added to a 5 ml. solution of 1 mg. 9,10-diphenyl-anthracene 0.2 ml. anhydrous hydrogen peroxide and 0.1 ml. methane sulfonic acid in 1,2-dimethoxyethane. No chemiluminescence is observed. However, on addition of 0.5 g. potassium hydroxide to the same solution a bright chemiluminescent light is produced. Thus, no significant amount of chemiluminescence is obtained at acidic conditions.

EXAMPLE 7

Several compounds related to those described by the general formula of this invention are tested for chemiluminescence.

The qualitative chemiluminescent light intensities are evaluated in comparison to oxalyl chloride hydrogen peroxide 9,10-diphenylanthracene system in 1,2 methoxyethane solvent by visual observation in a darkroom. The oxalyl chloride system is defined as strong (S) in contrast to a chemiluminescent light barely visible described as very weak (VW). The intermediate intensities are classified as medium strong (MS) medium (M) and weak (W). The tests conducted are designated as follows:

(A) approximately 3–5 mg. of the compound to be tested is added to a 5 ml. solution of 1 mg. 9,10-diphenylanthracene and 0.2 ml. anhydrous $H_2O_2$ in 1,2-dimethoxyethane at room temperature.

(B) same as Test A except the solution contains approximately 0.2 g. KOH.

(C) same as Test A except the solution contains approximately 0.2 ml. methane sulfonic acid.

The results are summarized in Table I.

TABLE I.—COMPOUNDS TESTED FOR CHEMILUMINESCENCE

| Ex. No. | Compound | A | B | C |
|---|---|---|---|---|
| 1–6 | $(CN)_2C=(CN)_2$ | VW | MS | VW |
| 7(a) | $Cl_2C=CCl_2$ | None | VW | None |
| 7(b) | $(C_6H_5)_2C=C(C_6H_5)_2$ | do | VW | Do |
| 7(c) | $(CN)_2C\overset{O}{\underset{}{\triangle}}C(CN)_2$ | VW | MS | VW |
| 7(d) | $CH_2\overset{O}{\underset{}{\triangle}}CH_2$ | None | None | None |
| 7(e) | $CH_3-CH\overset{O}{\underset{}{\triangle}}CH_2$ | do | do | Do |
| 7(f) | $(CH_3)_2C\overset{O}{\underset{}{\triangle}}C(CH_3)_2$ | do | None | Do |
| 7(g) | $NC-\overset{O}{\underset{\parallel}{C}}-CN$ | VW | MS | VW |
| 7(h) | $Cl_3C-\overset{O}{\underset{\parallel}{C}}-CCl_3$ | None | W | VW |
| 7(i) | $CH_3O-\overset{O}{\underset{\parallel}{C}}-OCH_3$ | do | None | None |
| 7(j) | $Cl-\overset{O}{\underset{\parallel}{C}}-Cl$ | do | do | Do |
| 7(k) | $CH_3-\overset{O}{\underset{\parallel}{C}}-\overset{O}{\underset{\parallel}{C}}-CH_3$ | do | do | Do |
| 7(l) | $C_6H_5-\overset{O}{\underset{\parallel}{C}}-\overset{O}{\underset{\parallel}{C}}-C_6H_5$ | do | VW | Do |
| 7(m) | $Cl_3C-\overset{O}{\underset{\parallel}{C}}-Cl$ | MS | MS | Do |
| 7(n) | $Cl_3-C-\overset{O}{\underset{\parallel}{C}}-O-CH_2-CH_3$ | None | W | Do |
| 7(o) | $(C_6H_5)_3C-\overset{O}{\underset{\parallel}{C}}-Cl$ | do | None | Do |

It is within the scope of this invention to make such modifications of the compositions and processes disclosed herein as would be obvious to a person of ordinary skill in this art, and it is to be understood that the examples illustrating this invention are intended to limit the invention only insofar as is stated in the specification and as the following claims are limited. Also, it is within the scope of this invention to form an apparatus or article such as a container which, for example, may be either (1) a substantially insoluble or alternatively (2) a dissolvable capsule in which the reactant or composition of this invention is substantially enclosed for subsequent reaction with other ingredients necessary to produce chemiluminescent light.

I claim:

1. A chemiluminescent reactant comprising (1) a first necessary chemiluminescent composition and (2) at least one additional ingredient necessary to produce chemiluminescent light when employed with the first necessary chemiluminescent composition, said additional ingredient being a member selected from the group consisting of a fluorescer and a hydroperoxide, said first composition comprising a compound of the formula:

where A is selected from the group consisting of (a) a vinylidene group substituted by a pair $X^2$ and $Y^2$, (b) an epoxyethylidene group substituted by a pair $X^3$ and $Y^3$, (c) oxomethylene, and (d) thioxomethylene, where each of $X^1$, $X^2$, $X^3$, $Y^1$, $Y^2$ and $Y^3$ substituents is selected from the group consisting of cyano, trichloromethyl, tribromomethyl, trifluoromethyl, chloro, bromo, and fluoro, provided that at least one substituent of each of the X—Y pairs is selected from the group consisting of cyano, trichloromethyl, tribromomethyl, and trifluoromethyl, said first composition being present in an amount sufficient to obtain chemiluminescent light when reacted.

2. A reactant according to claim 1, including at least one fluorescent compound.

3. A reactant according to claim 1, including at least one hydroperoxide compound.

4. A reactant according to claim 3, including at least one fluorescent compound.

5. A reactant according to claim 1, which comprises tetracyanoethylene.

6. A reactant according to claim 1, which comprises tetracyanoethylene oxide.

7. A reactant according to claim 1, which comprises trichloroacetyl chloride.

8. A reactant according to claim 1, including an alkaline material in an amount sufficient to obtain a pH above about pH 7.0.

9. A process for producing chemiluminescent light comprising reacting in a diluent the respective ingredients of the composition according to claim 4.

10. A composition comprising the reactant of claim 1 and a diluent.

References Cited
UNITED STATES PATENTS 3,624,221   8/1966   Winberg _____ 252—188.3

LEON D. ROSDOL, *Primary Examiner.*

J. D. WELSH, *Assistant Examiner.*

U.S. Cl. X.R.

252—301.2, 316

PO-1050
(5/69)

UNITED STATES PATENT OFFICE
CERTIFICATE OF CORRECTION

Patent No. 3,442,816      Dated May 6, 1969

Inventor(s) LASZLO JOSEPH BOLLYKY

It is certified that error appears in the above-identified patent and that said Letters Patent are hereby corrected as shown below:

Column 3, Line 61, the "of" should read -- or --, as shown on Page 5, Line 9 of the original specification as filed. Column 6, Line 26, the right-hand side of the arrow in the formula reading "(CN) $H_2O$" should read -- $(CN)_2 + H_2O$ -- as shown on Page 11, Line 9 of the original specification as filed; Line 29, the right-hand side of the arrow in the formula reading "(NC)$_2$ $H_2O$" should read -- $(NC)_2-C=O + H_2O$ -- as shown on Page 11, Line 12 of the original specification as filed; Line 33, before "chemiluminescence" insert -- + -- as shown on Page 11, Line 15 of the original specification as filed. Column 8, Line 21, the portion of the formula reading $$\begin{matrix} -O \\ \| \\ C \end{matrix} \quad \text{should read} \quad \begin{matrix} O \\ \| \\ C \end{matrix}$$

Line 24, the portion of the formula reading $$\begin{matrix} O \\ \| \\ C \end{matrix} \quad \text{should read} \quad \begin{matrix} O \\ \| \\ C \end{matrix}$$

as shown on Page 15, Table I, Example No. 7(g) and 7(h) of the original specification as filed.

SIGNED AND
SEALED
AUG 18 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,442,816      Dated May 6, 1969

Inventor(s) LASZLO JOSEPH BOLLYKY

It is certified that error appears in the above-identified patent and that said Letters Patent are hereby corrected as shown below:

Column 3, Line 61, the "of" should read -- or --, as shown on Page 5, Line 9 of the original specification as filed. Column 6, Line 26, the right-hand side of the arrow in the formula reading "(CN) $H_2O$" should read -- $(CN)_2 + H_2O$ -- as shown on Page 11, Line 9 of the original specification as filed; Line 29, the right-hand side of the arrow in the formula reading "(NC)$_2$ $H_2O$" should read -- $(NC)_2-C=O + H_2O$ -- as shown on Page 11, Line 12 of the original specification as filed; Line 33, before "chemiluminescence" insert -- + -- as shown on Page 11, Line 15 of the original specification as filed. Column 8, Line 21, the portion of the formula reading $$\underset{C}{\overset{-O}{\|}} \quad \text{should read} \quad \underset{C}{\overset{O}{\|}}$$

Line 24, the portion of the formula reading $$\underset{C}{\overset{O}{\|}} \quad \text{should read} \quad \underset{C}{\overset{O}{\|}}$$

as shown on Page 15, Table I, Example No. 7(g) and 7(h) of the original specification as filed.

SIGNED AND
SEALED
AUG 18 1970

(SEAL)
Attest:

Edward M. Fletcher, Jr.
Attesting Officer

WILLIAM E. SCHUYLER, JR.
Commissioner of Patents